(12) United States Patent
Futral

(10) Patent No.: US 6,212,543 B1
(45) Date of Patent: Apr. 3, 2001

(54) ASYMMETRIC WRITE-ONLY MESSAGE QUEUING ARCHITECTURE

(75) Inventor: William T. Futral, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/209,209

(22) Filed: Dec. 10, 1998

(51) Int. Cl.$^7$ ..................................................... G06F 13/00
(52) U.S. Cl. ............................................. 709/102; 710/29
(58) Field of Search ................................... 709/102–105, 709/204, 227–229; 710/29; 370/397–412

(56) References Cited

U.S. PATENT DOCUMENTS

| | | | |
|---|---|---|---|
| 4,403,285 | * 9/1983 | Kikuchi | 709/104 |
| 4,908,750 | * 3/1990 | Jablow | 709/103 |
| 5,430,874 | * 7/1995 | Kumazaki et al. | 709/103 |
| 5,708,660 | * 1/1998 | Riedel | 370/397 |
| 5,838,915 | * 11/1998 | Klausmeier et al. | 709/215 |
| 5,925,099 | 7/1999 | Futral et al. | 709/204 |
| 5,987,031 | * 11/1999 | Miller et al. | 370/412 |
| 5,987,580 | * 11/1999 | Jasuja et al. | 711/170 |
| 5,999,980 | * 12/1999 | Tanaka et al. | 709/235 |

* cited by examiner

*Primary Examiner*—Christopher B. Shin
(74) *Attorney, Agent, or Firm*—Blakely, Sokoloff, Taylor & Zafman LLP

(57) ABSTRACT

A method and apparatus for write-only message queuing that allows messages to be passed between devices in a system through use of write operations only. Because the present invention passes information between devices using write operations rather than read operations information can be passed more efficiently than use of both read and write operations to pass the same information. Conceptually, the present invention provides a queue that stores indicators of work to be processed (e.g., data, pointers to data). The queue also has free space that can be used to store newly arriving work to be processed. A device producing work to be stored in the queue (producer) stores indications of one or more of: the start of free space (free space head pointer), the top of work to be processed (work list head pointer) and the end of the free space (free space tail pointer). A device processing work in the queue (consumer) stores indications of one or more of: the end of work to be processed (work list tail pointer), the beginning of work to be processed (future work pointer), and the beginning of work processed (work pointer). Changes to pointers in either the producer or the consumer are written to the counterpart device so that pointer information is available without performing a read operation of the other device.

15 Claims, 5 Drawing Sheets

ASYMMETRIC WRITE-ONLY MESSAGE QUEUING ARCHITECTURE

FIELD OF THE INVENTION

The present invention relates to computer systems. More particularly, the present invention relates to message passing to and from input/output (I/O) subsystems within a computer system.

BACKGROUND OF THE INVENTION

Prior art computer system architectures typically assume that each process within the computer system has equal access to shared structures. However, access to shared structures is not equal when one or more processes access a structure via bus or other communications device and other processes access the structure locally. The processes that access the structure locally typically have a much lower cost in terms of latency and overhead than processes that access the same structure via a bus.

Costs in accessing structures across a bus are asymmetric in the sense that write operations can be performed more efficiently than read operations because the device writing data is not required to wait for a response from the device to which data is written. Read operations, however, require that the reading device either wait for data to be returned or halt activity to receive data from the device that is read. When bridges or other devices are involved in a read operation the cost becomes even greater because multiple devices are used in the communications path, which requires multiple access requests and grants.

What is needed is an architecture that passes messages to and from shared structures that takes advantage of the fact that write operations are more efficient that read operations.

SUMMARY OF THE INVENTION

A method and apparatus for asymmetric message queuing is described. A free list is maintained with a first device. A work list indicating data to be processed is maintained with a second device. A head pointer for the work list and a tail pointer for the free list are maintained with the first device. A head pointer for the free list and a tail pointer for the work list are maintained with the second device. In one embodiment, changes to the head pointer for the free list and changes to the tail pointer for the work list are caused by write operations from the second device. In one embodiment, changes to the head pointer for the work list and changes to the tail pointer for the free list are caused by write operations from the first device.

BRIEF DESCRIPTION OF THE DRAWINGS

The present invention is illustrated by way of example, and not by way of limitation in the figures of the accompanying drawings in which like reference numerals refer to similar elements.

DETAILED DESCRIPTION

A method and apparatus for asymmetric message queuing is described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Briefly, the present invention allows information to be passed between devices in a system through use of write operations only. Write operations can typically be performed more efficiently than read operations because read operations require a response from the device having data read. Write operations, on the other hand, do not require a response from the device to which data is written. Because the present invention passes information between devices using write operations rather than read operations information can be passed more efficiently than use of both read and write operations to pass the same information.

Conceptually, the present invention provides a queue that stores indicators of work to be processed (e.g., data, pointers to data). The queue also has free space that can be used to store newly arriving work to be processed. A device producing work to be stored in the queue (producer) stores indications of one or more of: the start of free space (free space head pointer), the top of work to be processed (work list head pointer) and the end of the free space (free space tail pointer). A device processing work in the queue (consumer) stores indications of one or more of: the end of work to be processed (work list tail pointer), the beginning of work to be processed (future work pointer), and the beginning of work processed (work pointer). Changes to pointers in either the producer or the consumer are written to the counterpart device so that pointer information is available without performing a read operation of the other device.

Figure 1:
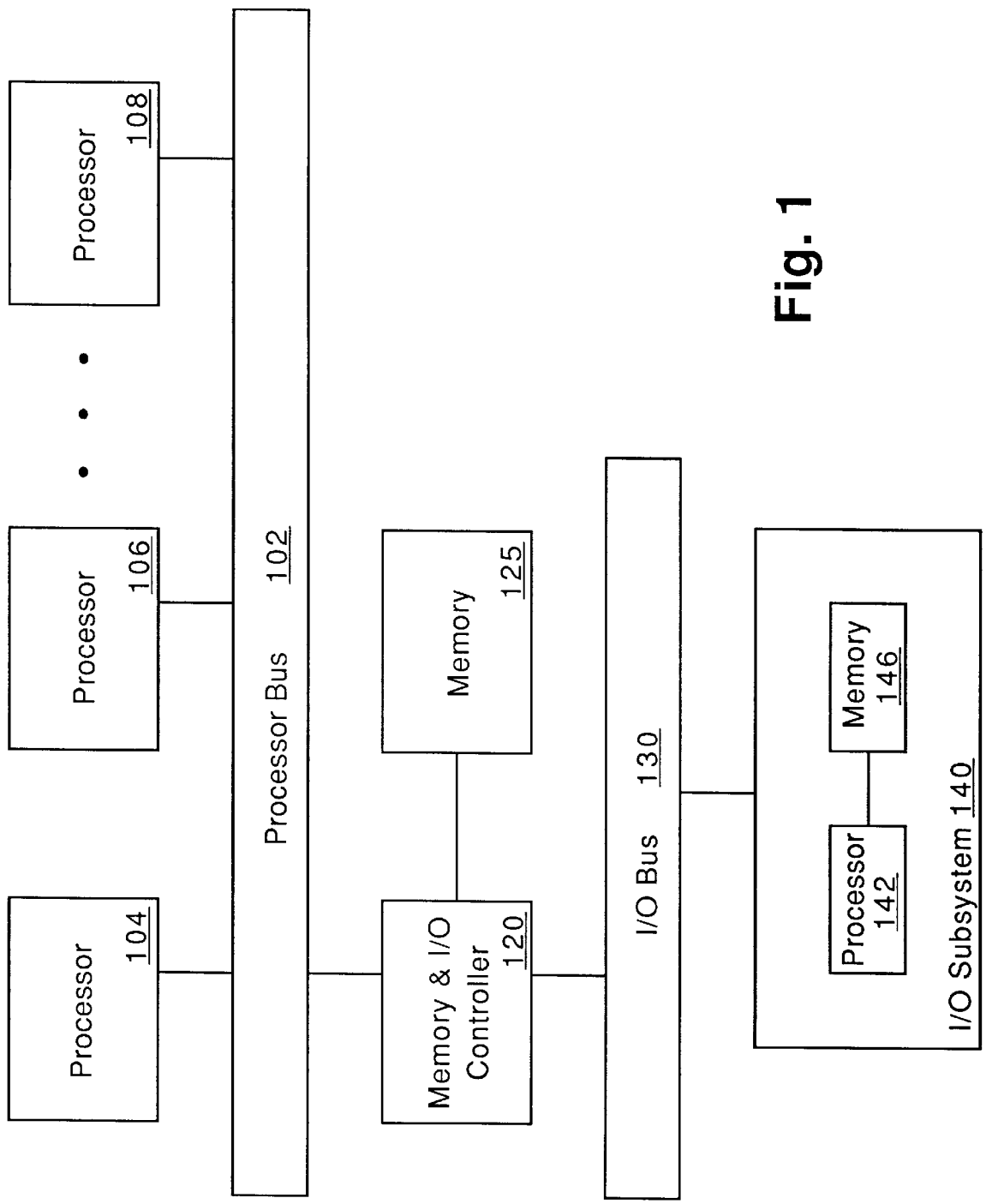
FIG. 1 is a multiprocessor computer system that can be used to practice the present invention.

FIG. 1 is a multiprocessor computer system that can be used to practice the present invention. The computer system of FIG. 1 includes an intelligent I/O subsystem; however, an intelligent I/O subsystem is not required to practice asymmetric message queuing as described herein. Asymmetric message queuing can be used to communicate between any two devices.

In one embodiment, computer system 100 includes multiple processors, such as processors 104, 106 and 108 coupled to processor bus 102. Any number of processors can be used in computer system 100. The present invention can also be practiced in a single processor computer system. While asymmetric message queuing does not require multiple processors within a computer system, asymmetric message queuing is particularly advantageous in multiprocessor environments for the reasons described in greater detail below.

Memory and I/O controller 120 is coupled to processor bus 102. Memory and I/O controller 120 processes transactions from processor bus 102 to memory 125 or I/O subsystems, such as I/O subsystem 140. I/O transactions are transferred to I/O subsystems via I/O bus 130.

I/O subsystem 140 is one example of an I/O subsystem that can be coupled to I/O bus 130 and is not intended to describe all potential I/O subsystems that can be used in accordance with the present invention. I/O subsystem 140 is an intelligent subsystem that includes processor 142 and memory 146.

Because processor 142 communicates with memory 125 or other devices, such as processors 104, 106 and 108 via multiple buses and a bus bridge, write operations can be performed more efficiently than read operations. If, for example, I/O subsystem 140 is a network communication subsystem, one of processors 104, 106 and 108 can write data to memory 125. The data can be processed by I/O subsystem 140 as controlled by processor 142. Pointers to data in memory 125 or 146 are updated by write operations from the device writing the data to memory.

Figure 2:
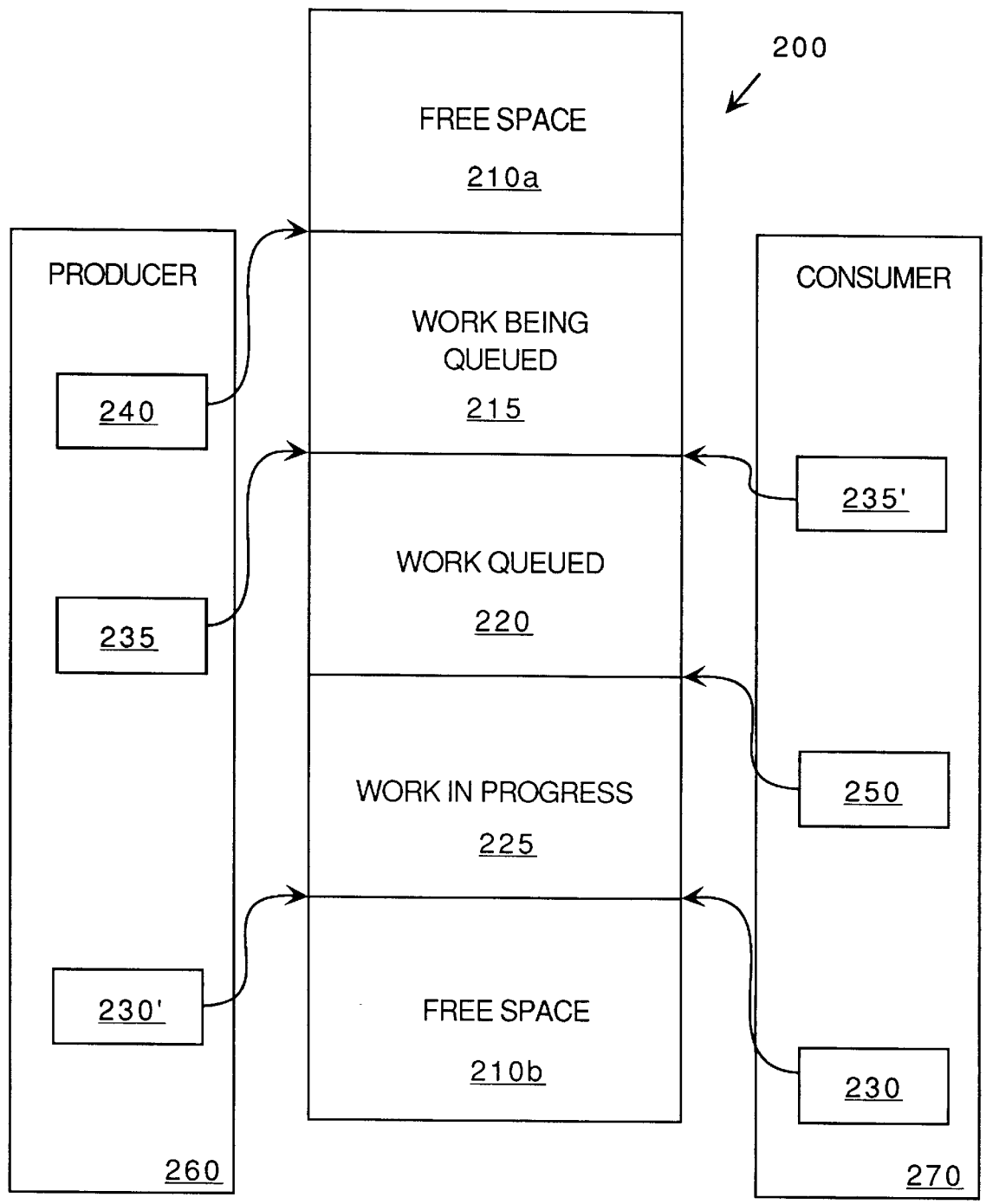
FIG. 2 is a general asymmetric message queuing architecture according to one embodiment of the present invention.

FIG. 2 is a general asymmetric message queuing architecture according to one embodiment of the present invention. Queue 200 is shown in FIG. 2 as a single queue; however, in one embodiment, queue 200 is distributed across multiple devices within a system as described in greater detail below. In one embodiment, queue 200 is implemented as a circular queue with four sections: free space 210 (210a and 210b); work being queued 215, which is data being placed in the queue; work queued 220, which is data placed in the queue; and work in progress 225, which is data being processed.

Free space 210 is the portion of queue 200 that is available to store data to be processed. Free space 210 becomes available either through initialization of queue 200 or through queue entries being processed as appropriate and the associated queue space is returned to free space 210 to be available for reuse. Conceptually, free space 210a and 210b are the same portion because queue 200 is a circular queue.

Work being queued 215 is data that is placed in queue 200 by producer 260 the presence of which has not yet been communicated to consumer 270 as work to be processed. In other words, work being queued 215 is considered to be free space by consumer 270. However, because consumer 270 does not place data at the head of queue 200, consumer 270 does not overwrite data placed in queue 200 by producer 260. Producer 260 stores pointer 240 that indicates the head (start) of free space 210. Pointer 240 is the working pointer of producer 260 that indicates where producer 260 stores data in queue 200.

Work queued 220 is data stored in queue 200 by producer 260 that is to be processed by 270. Producer 260 stores pointer 235 that indicates the head or work queued 220. Producer 260 communicates the presence of work queued 220 by writing the value of pointer 235 to consumer 270 (labeled 235'). In one embodiment producer 260 writes the value of pointer 235 to consumer 270. By writing the value of pointer 235 as changes occur, the present invention takes advantage of the lower system cost of write operations as compared to read operations.

Work in progress 225 is the work that consumer 270 has begun to process, but processing is not yet complete. Consumer 270 stores pointer 250 that indicates the head of work in progress 225. Pointer 250 is the working pointer for consumer 270 that tracks work that has been processed and work that has not been processed. Consumer 270 stores pointer 230 that indicates the tail (end) of free space 210.

As work is processed by consumer 270, the value of free space tail pointer 230 changes. Changes to pointer 230 are written by consumer 270 to producer 260, which stores pointer 230'. By writing the value of pointer 230 as changes occur, the present invention takes advantage of the lower system cost of write operations as compared to read operations.

Figure 3:
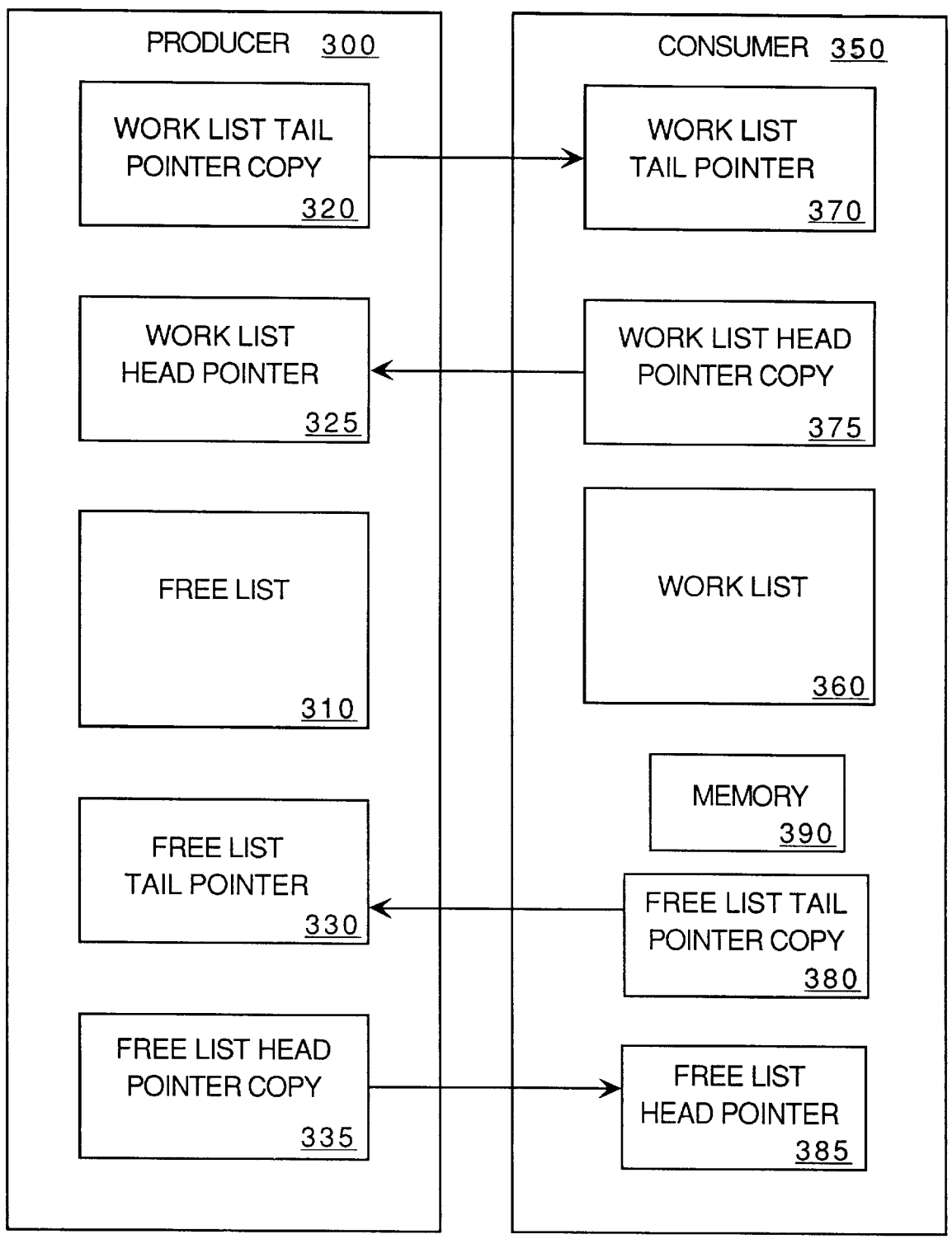
FIG. 3 is a distributed asymmetric message queuing architecture according to one embodiment of the present invention.

FIG. 3 is a distributed asymmetric message queuing architecture according to one embodiment of the present invention. In general, free list 310 in producer 300 and work list 360 in consumer 350 together provide queue 200 of FIG. 2. In one embodiment, free list 310 includes free space 210 and work being queued 215. Work list 360 includes work queued 220 and work in progress 225.

In one embodiment, work list 360 stores pointers to locations in memory 390. The architecture of FIG. 3 can be used, for example, for processing message frames. In such an embodiment, data (e.g., frames) to be processed are written to memory 390 by producer 300. Any data format or data structure can be used. Pointers stored in work list 360 point to frames stored in memory 390, which are processed by consumer 350. While memory 390 of FIG. 3 is part of consumer 350, memory 390 can be part of producer 300 or a third device (not shown in FIG. 3).

In operation, producer 300 maintains work list tail pointer copy 320 and free list head pointer copy 335, which correspond to the tail of work list 360 and head of free list 310, respectively. Work list tail pointer copy 320 is written to consumer 350 such that consumer 350 maintains work list tail pointer 370. Similarly, producer 300 writes free list head pointer copy 335 to consumer 350 such that consumer 350 maintains free list head pointer 385.

Consumer 350 stores work list head pointer copy 375 and free list tail pointer copy 380, which correspond to the head of work list 360 and tail of free list 310, respectively. Work list head pointer copy 375 is written to producer 300 by consumer 350. Similarly, free list tail pointer copy 380 is written to producer 300.

The various pointers described above are maintained as described so that modifications to the pointers are written to the counterpart device in order to avoid read operations by the counterpart device to determine pointer values. Thus, consumer 350 maintains pointers that are affected by processing of work list 360 and when the processing results in a modification of a pointer value, the modified pointer value is written to producer 300. Similarly, producer 300 maintains pointers that are affected by changes to free list 310 and writes changes to the pointers to consumer 350.

In one embodiment, work list 360 is large enough that more pointers can be stored therein than frames can be stored in memory 390. Free list 310 is the same size as work list 360. Both work list 360 and free list 310 can store more data than necessary. In other words, free list 310 can store more data (e.g., pointers, addresses) than corresponding data structures are available (e.g., free space 210). Thus, the present invention allows tracking of head and tail pointers by two devices without requiring read operations.

In one embodiment, the present invention incurs an overhead of one write operation per queue transaction to update the corresponding counterpart device. However, because write operations cost less, in terms of system resources, than read operations, overall system performance can be improved.

Figure 4:
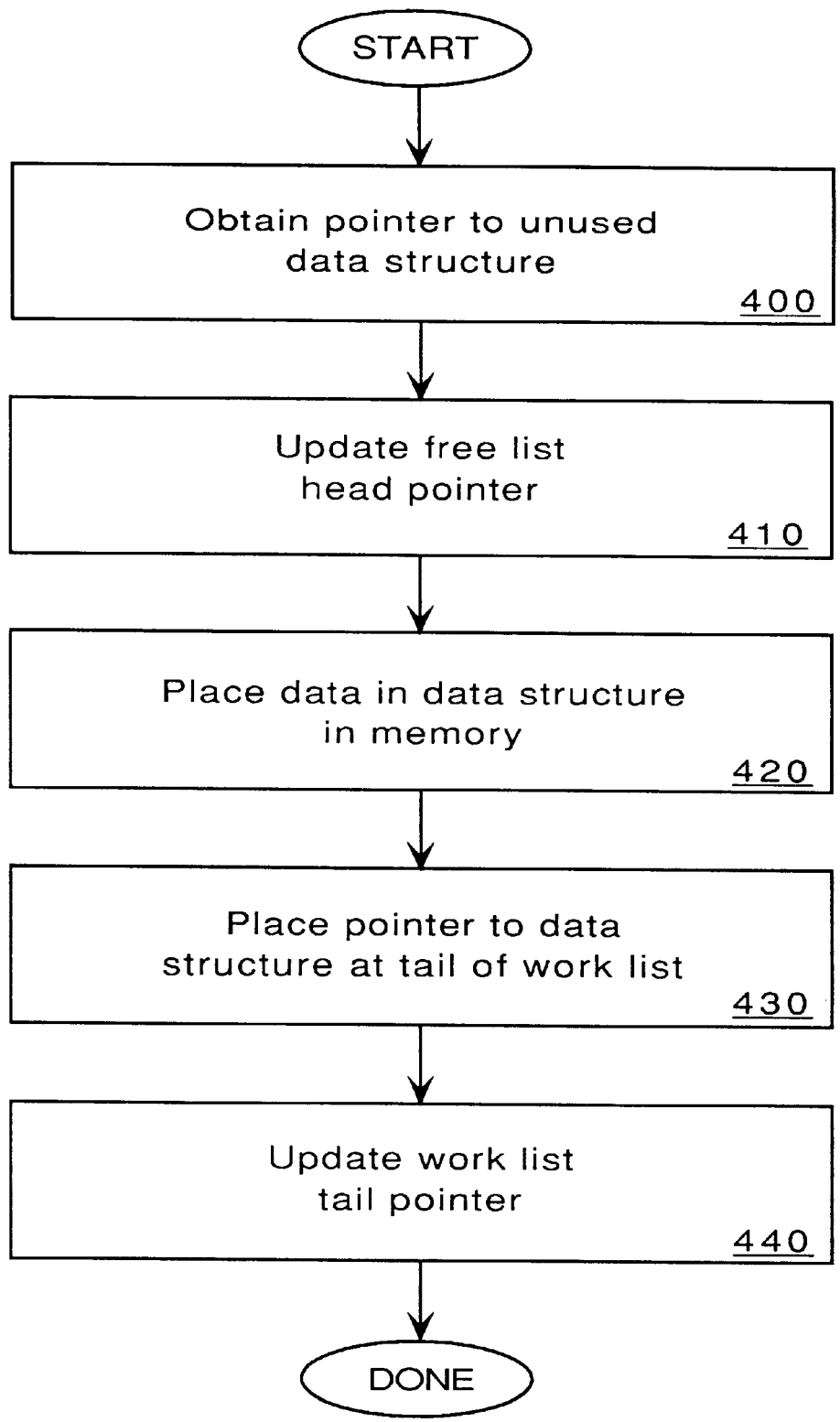
FIG. 4 is a flow chart for producing work for asymmetric message queuing according to one embodiment of the present invention.

FIG. 4 is a flow chart for producing work for asymmetric message queuing according to one embodiment of the present invention. While the flow of FIG. 4 is described in a particular order, the present invention does not necessarily require the specific ordering of FIG. 4. For example, data can be placed in memory either before or after the free list pointer is updated.

The producer obtains a pointer to an unused data structure from the head of the free list at 400. The producer device updates the free list head pointer at 410. In one embodiment, the producer writes a new head pointer value to a consumer device.

Alternatively, the producer cart provide an increment command to the consumer that causes the consumer to increment the head pointer by a predetermined amount.

Data is placed in the data structure in memory indicated by the pointer at 420. In one embodiment, the memory is not part of the consumer or the producer, for example, memory 125 of FIG. 1. Alternatively, the memory can be part of the producer or the consumer, for example, memory 390 of FIG. 3. In an environment where communication is accomplished by use of frames, data to be communicated is stored in the memory and accessed by the consumer when necessary.

A pointer to the data structure is placed in the work list at 430. The pointer is used by the consumer to locate data to be processed. Placing the pointer in the work list is accomplished as described above with respect to FIG. 2.

The work list tail pointer is updated at 440. In one embodiment, a new pointer value is written to the consumer by the producer. In one embodiment the tail pointer of the work list is updated each time the producer writes to the work list. Alternatively, the pointer value in the consumer can be incremented by a predetermined amount by the producer.

Figure 5:
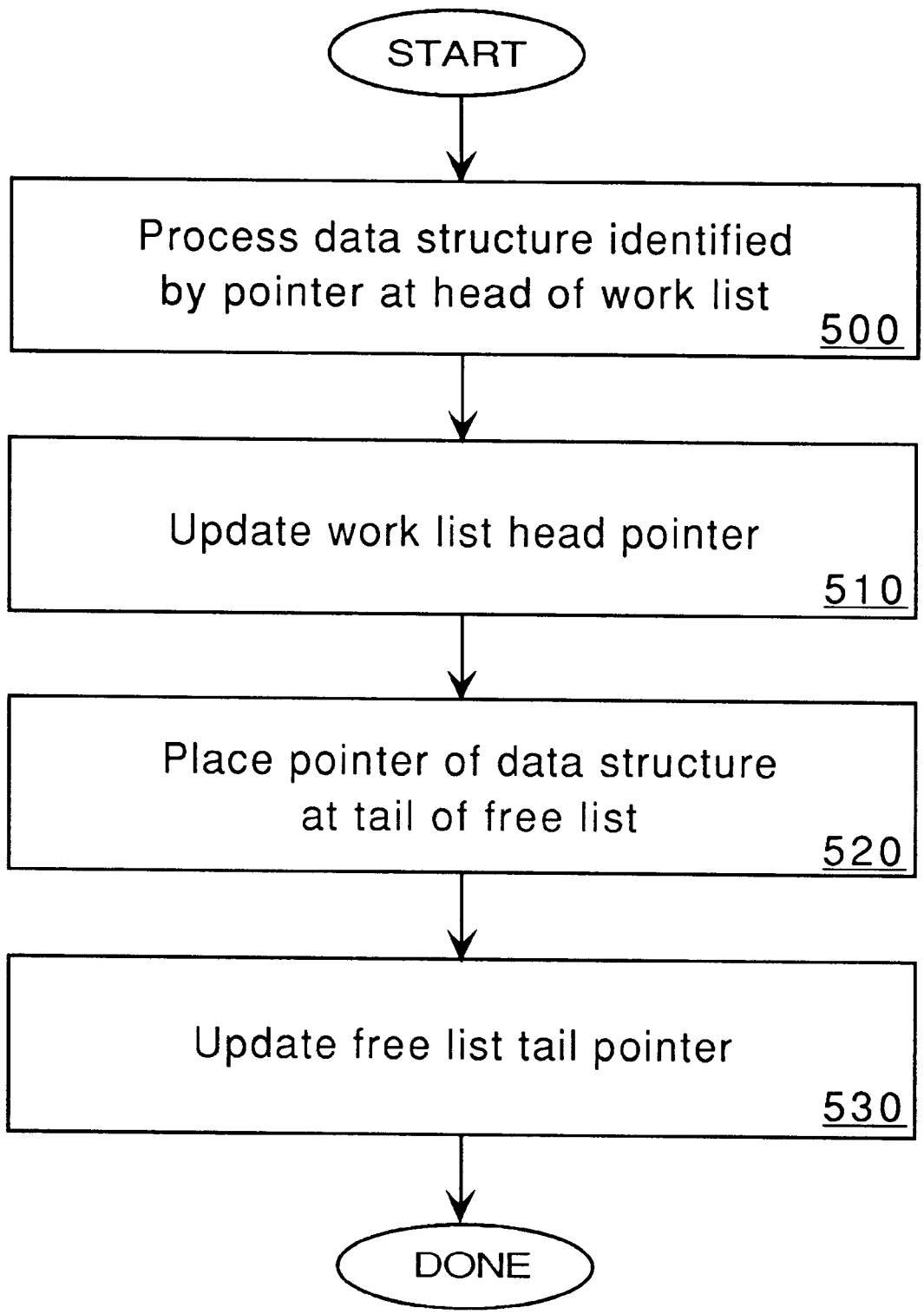
FIG. 5 is a flow chart for consuming work for asymmetric message queuing according to one embodiment of the present invention.

FIG. 5 is a flow chart for consuming work for asymmetric message queuing according to one embodiment of the present invention. As with the flow if FIG. 4, the specific sequence described with respect to FIG. 5 is not necessarily required to practice the present invention.

The consumer processes data in the data structure identified by the pointer at the head of the work list at 500. The work list head pointer is updated at 510. In one embodiment, the consumer writes a new work list head pointer value to the producer. Of course,the consumer can also increment the head pointer in the producer by communicating a proper command.

After the data in the data structure is processed the consumer returns the data structure to the free list by placing the data structure at the tail of the free list at 520. In one embodiment, the free list stores pointers to free locations in the memory. Alternatively, other indicators of free memory can be used. The free list tail pointer is updated at 530. In one embodiment, the consumer writes a new tail pointer value to the producer. Alternatively, other pointer updates can be used.

In the foregoing specification, the present invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method for message queuing comprising:

maintaining a free list with a first device;

maintaining a work list indicating data to be processed with a second device;

maintaining a head pointer for the work list and a tail pointer for the free list with the first device; and maintaining a head pointer for the free list and a tail pointer for the work list with the second device.

2. The method of claim 1 further comprising writing, with the second device, changes to the head pointer for the work list in response to data from the work list being processed.

3. The method of claim 1 further comprising writing, with the second device, changes to the tail pointer for the free list in response to data from the work list being processed.

4. The method of claim 1 further comprising writing, with the first device, changes to the head pointer for the free list in response to unsued data structures from the free list being used.

5. The method of claim 1 further comprising writing, with the first device, changes to the tail pointer for the work list in response to data being added to the work list.

6. An apparatus for message queuing comprising:

means for maintaining a free list with a first device;

means for maintaining a work list indicating data to be processed with a second device;

means for maintaining a head pointer for the work list and a tail pointer for the free list with the first device; and means for maintaining a head pointer for the free list and a tail pointer for the work list with the second device.

7. The apparatus of claim 6 further comprising means for writing, with the second device, changes to the head pointer for the work list in response to data from the work list being processed.

8. The method of claim 6 further comprising means for writing, with the second device, changes to the tail pointer for the free list in response to data from the work list being processed.

9. The method of claim 6 further comprising means for writing, with the first device, changes to the head pointer for the free list in response to data being removed from the free list.

10. The method of claim 6 further comprising means for writing, with the first device, changes to the tail pointer for the work list in response to data being added to the work list.

11. A system comprising:

a first device having a memory to store a free list, a tail pointer for the free list, and a head pointer for a work list; and a second device having a memory to store the work list, a tail pointer for the work list, and a head pointer for the free list;

wherein the first device writes the tail pointer of the work list and the head pointer of the free list to the second device and the second device writes the tail pointer of the free list and the head pointer of the work list to the first device.

12. The system of claim 11 wherein the first device further comprises a memory storing a copy of the work list tail pointer and a copy of the free list head pointer.

13. The system of claim 11 wherein the second device further comprises memory storing a copy of the work list head pointer and a copy of the free list tail pointer.

14. A method of message queuing comprising:

maintaining a queue;

maintaining a first head pointer and a first tail pointer corresponding to free space in the queue with a first device;

maintaining a second head pointer and a second tail pointer corresponding to data in the queue to be processed;

writing the first head pointer and the first tail pointer to the second device with the first device;

writing the second head pointer and the second tail pointer to the first device with the second device; and processing data in the queue based on the first head pointer, the first tail pointer, the second head pointer, and the second tail pointer.

15. The method of claim 14 wherein the data in the queue comprises pointers to data stored in a memory external to the first device and the second device.

* * * * *